(12) United States Patent
Joppeck

(10) Patent No.: US 7,878,316 B2
(45) Date of Patent: Feb. 1, 2011

(54) HIGH TORQUE ONE WAY CLUTCH

(75) Inventor: Dwayne P. Joppeck, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 640 days.

(21) Appl. No.: 11/869,439

(22) Filed: Oct. 9, 2007

(65) Prior Publication Data

US 2009/0090590 A1 Apr. 9, 2009

(51) Int. Cl.
*F16D 41/069* (2006.01)
(52) U.S. Cl. .......................... 192/46; 60/345
(58) Field of Classification Search .................. 192/46, 192/64; 60/345
See application file for complete search history.

(56) References Cited

U.S. PATENT DOCUMENTS 2,879,869 A * 3/1959 Dodge ..................... 192/45.1
3,166,171 A * 1/1965 Schwerdhofer et al. ....... 192/64

2006/0021839 A1 2/2006 Kimes

* cited by examiner

*Primary Examiner*—Rodney H Bonck

(57) ABSTRACT

A high torque capacity one-way clutch includes a first, inner annulus nested within a second, outer annulus. The inner annulus includes a plurality of transverse grooves on its outer surface as well as a centrally disposed circumferential groove. A like plurality of moveable struts having a central opening are received within respective grooves in the inner annulus and are retained there by a circumferential band passing through the openings in the struts and received in the circumferential groove. The outer annulus includes a plurality of transverse grooves on its inner surface and receives the inner annulus, struts and circumferential band. Upon relative rotation of the annuli in one direction, the struts engage the grooves and inhibit rotation between the annuli, thereby transmitting torque. Upon relative rotation in the opposite direction, the struts slide along the inner surface of the outer annulus without engaging and thus do not transmit torque.

21 Claims, 4 Drawing Sheets

HIGH TORQUE ONE WAY CLUTCH

FIELD

The present disclosure relates to one-way clutches and more particularly to a simplified one-way clutch assembly having a high torque capacity.

BACKGROUND

The statements in this section merely provide background information related to the present disclosure and may or may not constitute prior art.

In power transmission devices which shift between two or more speed ratios such as automotive automatic transmissions and certain power tools, one-way clutches are frequently employed to ensure smooth and reliable shifts. One-way clutches are devices that transmit torque in one relative rotational direction but do not transmit torque in the opposite relative rotational direction. There are several different types of one-way clutches that are currently in use. Roller clutches, sprag clutches, rocker clutches and dog clutches are the more commonly encountered types.

Roller one-way clutches, as the name implies, utilize a plurality of rollers disposed between nesting annular members having ramped or camming surfaces against which the rollers wedge in one direction of relative rotation and release in the opposite direction of relative rotation. Sprag clutches are similar, utilizing dipole or dog bone elements in place of the rollers, and both rely upon friction to transmit torque in the engaged state.

In contrast to roller and sprag one-way clutches are rocker clutches or dog clutches. Instead of a friction based mechanism, these clutches rely upon the more robust operation of abutment and engagement of opposing faces of a plurality of clutch elements. Because the torque transmitting mode is achieved through moveable elements such as struts which positively engage and couple inner and outer annular members, higher torque capacities are possible with this design The present invention is directed to an improved and simplified high torque capacity one-way clutch having a plurality of moveable struts.

SUMMARY

The present invention provides a high torque capacity one-way clutch having a first, inner annulus nested within a second, outer annulus. The first, inner annulus includes a plurality of transverse grooves or pockets on its outer surface as well as a centrally disposed circumferential groove. A like plurality of moveable clutch elements such as struts having a central opening are received within respective pockets in the inner annulus and are retained there by a circumferential retaining band passing through the openings in the struts and received in the circumferential groove. The second, outer annulus includes a plurality of transverse grooves or pockets on its inner surface and receives the inner annulus, clutch elements and circumferential band. Upon relative rotation of the inner and outer annuli in one direction, the struts engage the grooves in the inner and outer annuli and inhibit rotation between the annuli, thereby transmitting torque. Upon relative rotation of the inner and outer annuli in the opposite direction, the struts slide along the inner surface of the outer annulus without engaging and thus do not transmit torque.

Thus it is an object of the present invention to provide a high torque capacity one-way clutch.

It is a further object of the present invention to provide a high torque capacity one-way clutch having a first, inner annulus having a plurality of transverse grooves and a circumferential groove on its outer surface.

It is a still further object of the present invention to provide a high torque capacity one-way clutch having a second, outer annulus having a plurality of transverse grooves on its inner surface.

It is a still further object of the present invention to provide a high torque capacity one-way clutch having a plurality of struts each defining an opening for receiving a circumferential retaining band.

It is a still further object of the present invention to provide a high torque capacity one-way clutch having a circumferential retaining band disposed about the circumference of a inner clutch annulus for retaining a plurality of clutch elements.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
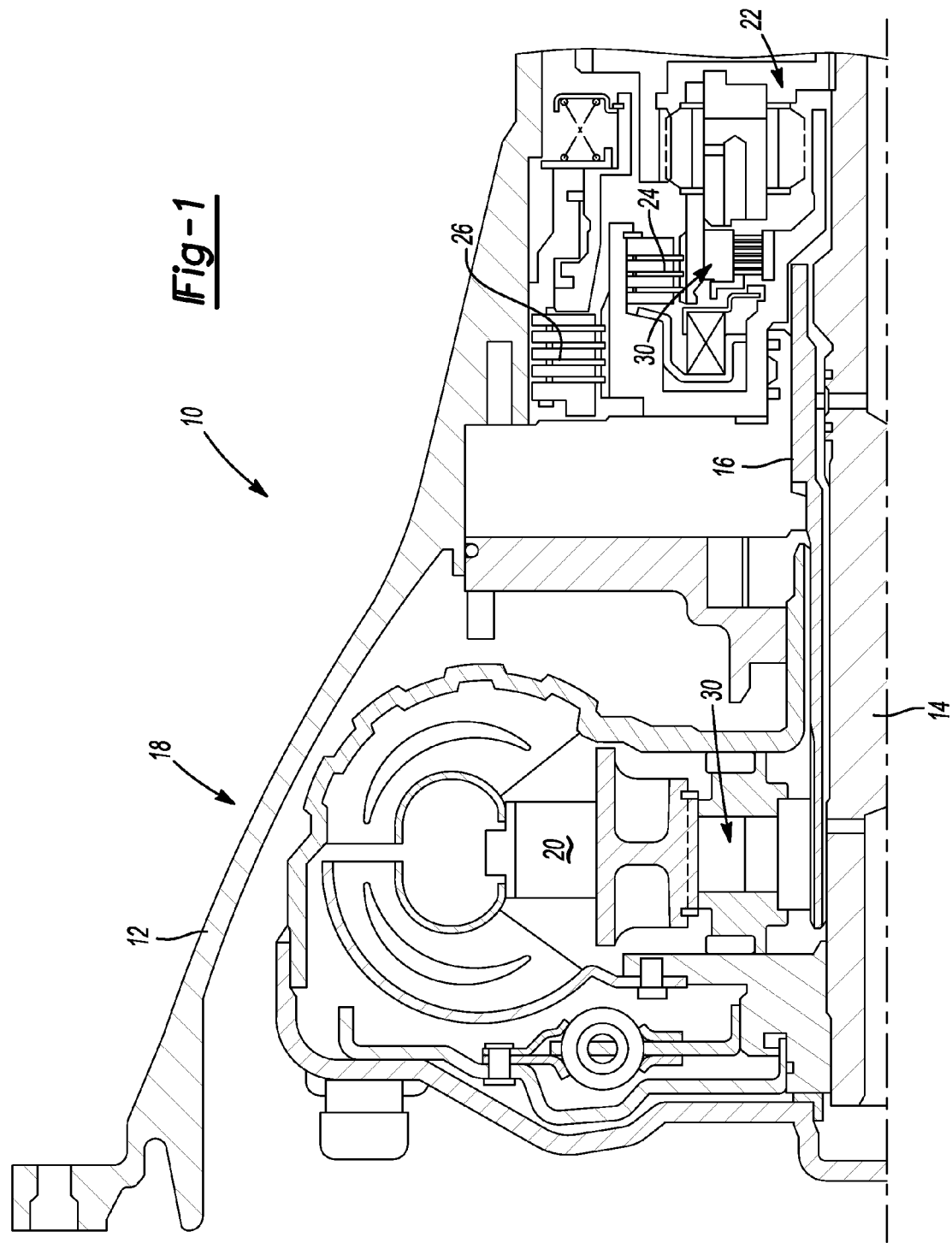
FIG. 1 is a fragmentary, half sectional view of an automatic transmission for a motor vehicle incorporating a one-way clutch according to the present invention.

With reference to FIG. 1, a portion of an automatic transmission incorporating the present invention is illustrated and generally designated by the reference number 10. The automatic transmission 10 includes a housing 12 which supports, locates and protects various components of the automatic transmission 10 such as an input shaft 14, a concentrically disposed tubular shaft or quill 16 and a torque converter 18 having a stator 20. The automatic transmission 10 typically includes a plurality of planetary gear assemblies 22, one of which is illustrated in FIG. 1. Active torque transmitting devices such as clutches 24 and brakes 26, one of both being illustrated in FIG. 1, selectively connect various components of the transmission 10 to achieve a plurality of forward speeds or gear ratios. Operably disposed between both the stator 20 of the torque converter 18 and the shaft or quill 24 and a component of the planetary gear assembly 22 and the clutch 24 are high torque capacity one-way or overrunning clutches 30 according to the present invention.

It will be appreciated that the locations of the one-way clutches 30 in the automatic transmission 10 illustrated are by way of example only and that one-way clutches 30 according to the present invention may be utilized in other locations and for other purposes both in automatic transmissions and other power transferring and controlling devices.

Figure 2:
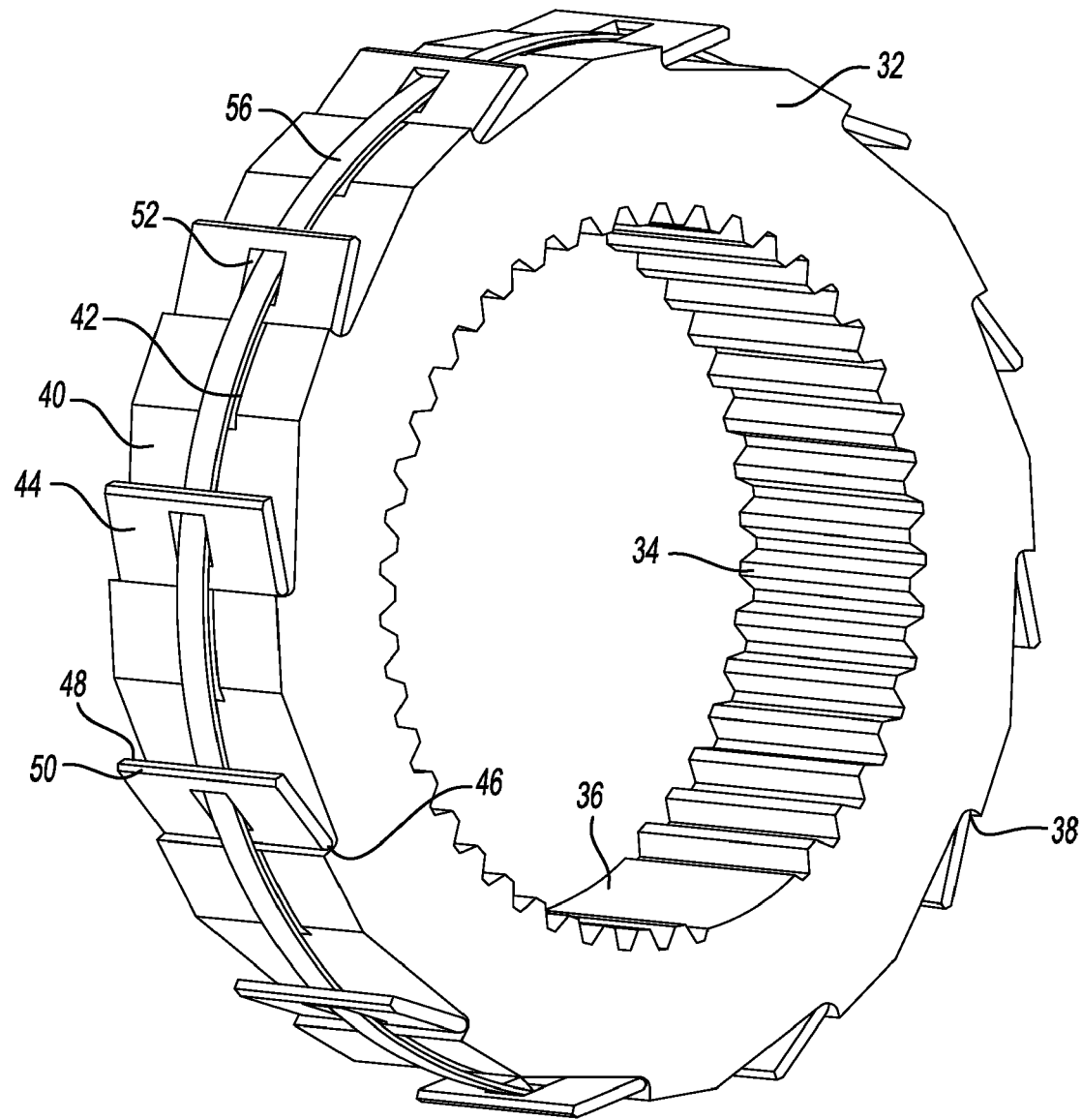
FIG. 2 is a perspective view of an inner annulus of a one-way clutch according to the present invention.

Referring now to FIGS. 1 and 2, the high torque one-way clutch 30 includes a first or inner annulus 32 having internal or female splines or gear teeth 34 which rotationally couple it to, for example, complementary male splines or gear teeth (not illustrated) on a component of, for example, an automatic transmission, such as the shaft or quill 16. If desired, one or two splines or gear teeth 34 may not be cut to form a key or index feature 36 which ensures mounting of the inner annulus 32 to an associated component, for example, the shaft or quill 16, only in one relative angular position.

The first or inner annulus 32 defines a plurality, for example, 12, transverse grooves or pockets 38 about the outer surface 40 of the inner annulus 32. Depending upon the diameter of the inner annulus, more or fewer grooves or pockets 38 may be utilized; in smaller diameter and lower capacity clutches, for example, 3, 4, 6, 8 or 10 grooves or pockets 38 may be utilized and in larger diameter and higher capacity clutches, for example, 14, 16 or 20 grooves or pockets 38 may be utilized. Centrally axially disposed on the outer surface 40 of the inner annulus 32 is a discontinuous circumferential channel or groove 42.

Figure 3:
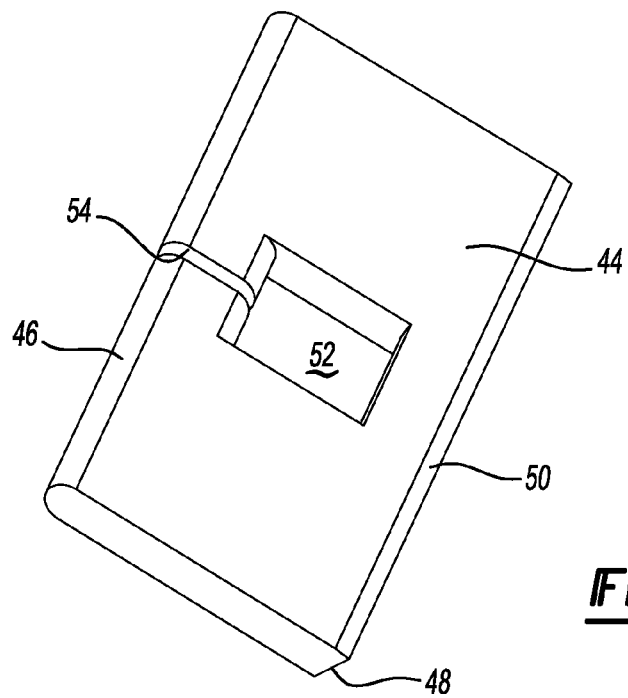
FIG. 3 is an enlarged, perspective view of a strut of a one-way clutch according to the present invention.

As illustrated in FIGS. 2 and 3, preferably residing in each transverse groove or pocket 38 is a moveable clutch element or strut 44. Each of the struts 44 preferably defines a width slightly less than the width of the inner annulus 32 and includes a first, rounded, i.e., cylindrical end 46 that seats in the groove or pocket 38, a second, oblique end 48 and a narrow chamfer 50 along the outer surface of the strut 44 adjacent the oblique end 48. The struts 44 also define a centrally disposed rectangular opening 52. A thin slot 54 communicates between the opening 52 and the cylindrical end 46 of the strut 44. The thin slots facilitate assembly and repair of the one-way clutch 30 but may be omitted if desired. Extending about the periphery of the inner annulus 32 in the circumferential groove or channel 42 and received within each rectangular opening 52 of each strut 44 is a retaining spring, hoop or band 56. The retaining band 56 is preferably metal such as spring steel and is therefore flexible but non-extensible. Preferably, the ends of the retaining band 56 are welded together or secured by other means to form a hoop having a diameter which is just slightly larger than the nominal outside diameter of the inner annulus 32. The retaining band 56 maintains the plurality of struts 44 not only within a respective one of the grooves or pockets 38 but also axially centered in the pockets 38 in the outer surface 40 of the inner annulus 32. The retaining band 56 also provides a biasing force to the struts 44 which moves them away from the outer surface 40 of the inner annulus 32 as illustrated in FIG. 2.

Figure 4:
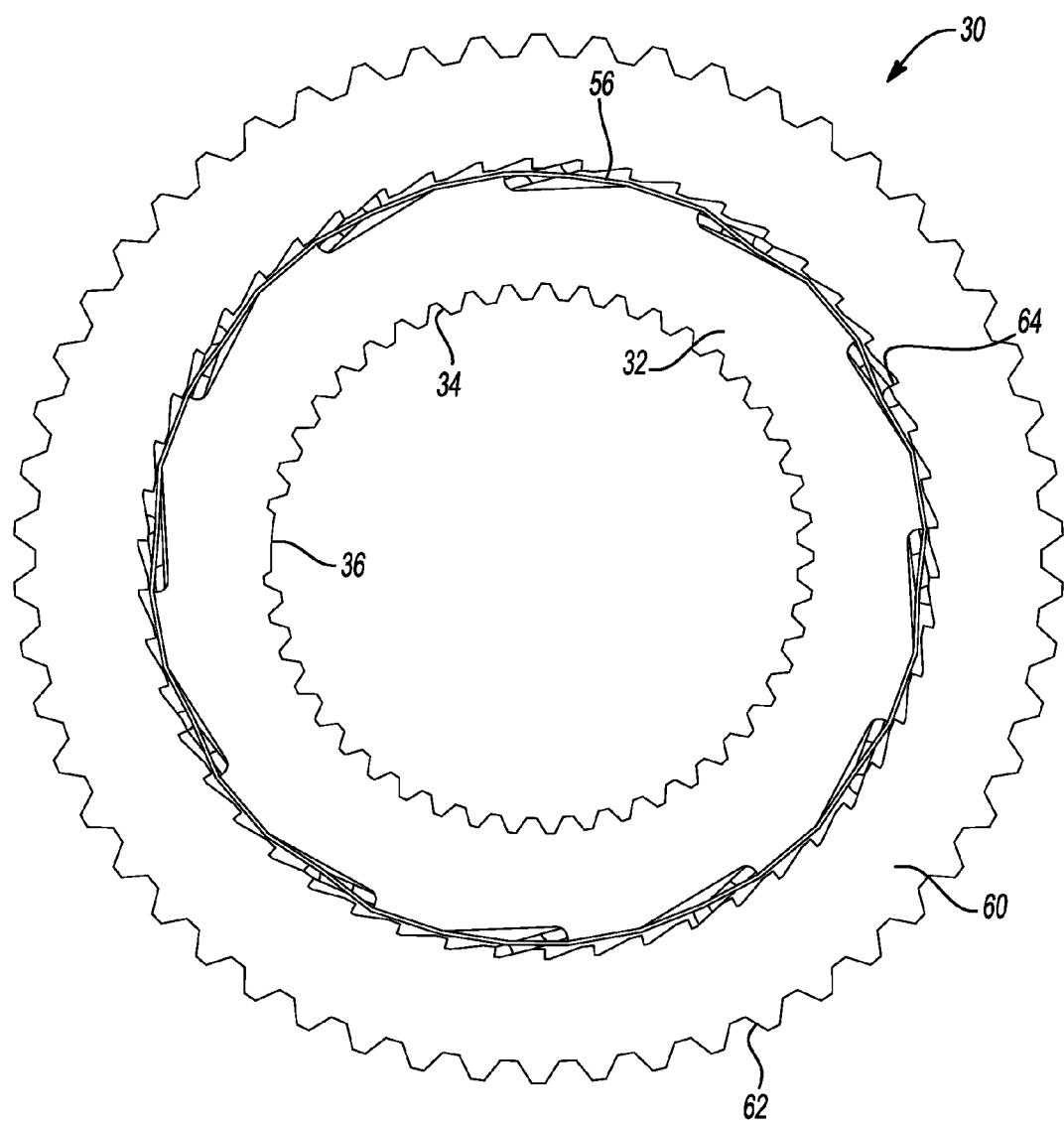
FIG. 4 is a side, elevational view of a one-way clutch according to the present invention.

Referring now to FIG. 4, the high torque one-way clutch 30 also includes a second or outer annulus 60. The second, outer annulus 60 includes male or external splines or gear teeth 62 which are complementary to and couple the outer annulus 60 to, for example, a component of the automatic transmission 10 such as the stator 20. The inner surface of the second, outer annulus 60 defines a plurality of transverse grooves or notches 64 which are engageable by the struts 44.

The actual number of the struts 44 (and the pockets 38) on the first, inner annulus 32 and the notches 64 on the second, outer annulus 60 and the ratio or relationship between them are the subject of several engineering considerations. On the one hand, the higher the number of the struts 44 that simultaneously engage, the higher the torque capacity of the clutch 30. This suggests that with twelve of the struts 44, the outer annulus should include twelve of the notches 64 or a multiple thereof, e.g., twenty-four, thirty-six or forty-eight. However, given reasonable manufacturing tolerances, it is unrealistic to expect that all twelve of the struts 44 will fully engage and carry equal loads. Moreover, this configuration, especially with a smaller number of the notches 64, can result in significant backlash, i.e., motion occurring after a reversal of rotation but before clutch lock-up. If significant torque is present immediately upon the reversal of rotation, it is typically followed by an abrupt and harsh clutch engagement. Depending upon the application, this may or may not be acceptable but it invariably causes accelerated wear of the clutch components.

On the other hand, non-multiple relationships or ratios between the number of the pockets 38 (and the struts 44) and the notches 64 will result in a smaller number of simultaneously engaged struts 44 and thus nominally lower torque capacity but significantly reduced backlash. For example, in the embodiment illustrated and as noted, there are twelve of the pockets 38 and twelve of the struts 44 on the inner annulus 32. Excellent operation, i.e., rapid and smooth lock-up and torque transmission with acceptable backlash has been found to occur with fifty transverse grooves or notches 64 in the outer annulus 60. In this configuration, only two of the struts 44, which are 180° apart, are simultaneously engaged at any given time. Accordingly, it should be appreciated that the number of the pockets 38 and the struts 44 on the inner annulus 32 and the number of the notches 64 on the outer annulus 60 utilized in combination may vary but preferably will facilitate simultaneous engagement of two, three, four or more of the struts 44 which are evenly spaced, i.e., 180°, 120° or 90° apart around the inner annulus 32.

Figure 5:
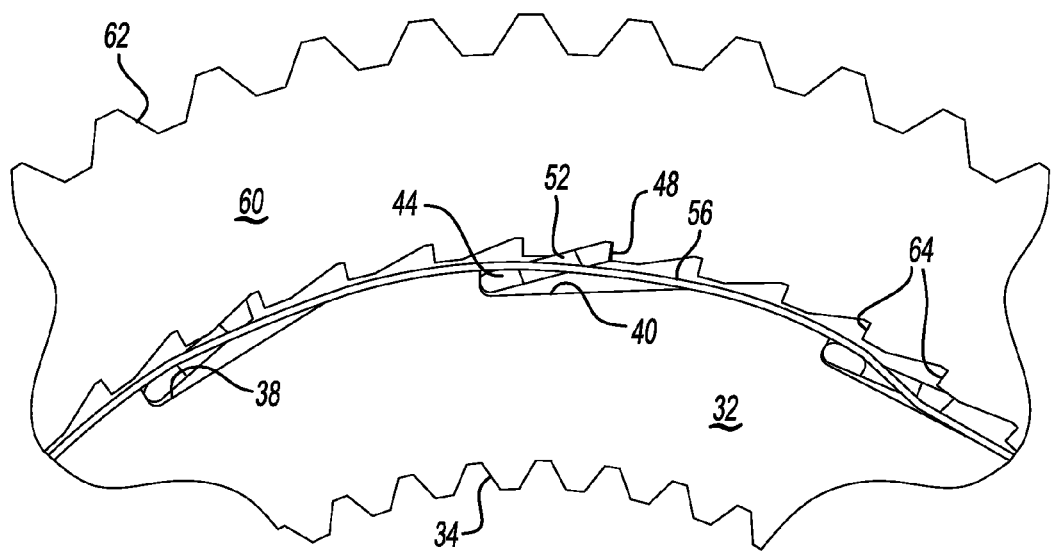
FIG. 5 is an enlarged, fragmentary, side elevational view a one-way clutch according to the present invention.

Referring now to FIG. 5, the operation of the high torque one-way clutch 30 will now be described. It will be appreciated that the first, inner annulus 32 may be driven by or drive an associated circular member having splines or gear teeth complementary to the female splines or gear teeth 34. Likewise, the second, outer annulus 60 may drive, be driven by or maintained in a stationary position by an associated circular member having splines or gear teeth complementary to the male splines or gear teeth 62. In one direction of relative rotation between the inner annulus 32 and the outer annulus 60, for example, when the inner annulus 32 rotates counterclockwise relative to the outer annulus 60, the struts 44 slide along the notches 64 and no torque is transmitted. If, however, the inner annulus 32 attempts to rotate clockwise relative to the outer annulus 60, the struts 44 which are biased radially outwardly by the retaining band 56, rapidly and with minimal rotation, engage the notches 64, coupling the inner annulus 32 to the outer annulus 60 and transmitting torque therebetween. It will be appreciated that significant torque levels can be transmitted through the high torque one-way clutch 30 according to the present invention since it utilizes abutting faces of the struts 44 to transmit torque rather than friction elements. Torque capacity of the one-way clutch 30 can readily be increased by increasing the width of the inner and outer annuli 32 and 60 as well as the struts 44.

The description of the invention is merely exemplary in nature and variations that do not depart from the gist of the invention are intended to be within the scope of the invention. Such variations are not to be regarded as a departure from the spirit and scope of the invention.

What is claimed is:

1. A one-way clutch comprising, in combination,
    a first annulus having a first plurality of transverse grooves and a discontinuous circumferential groove on an outer surface,
    a plurality of struts disposed in said first plurality of transverse grooves, each of said struts including a first end portion disposed within the first plurality of grooves and a second end portion opposite the first end portion, each of said struts defining an opening disposed between and at least partially enclosed by the first end portion and the second end portion, a retaining band extending through said opening in each of said struts and about said first annulus in said circumferential groove, wherein the retaining band exerts a radially outward force on the second end portion of each of the plurality of struts, and a second annulus disposed about said first annulus and having a second plurality of transverse grooves on an inner surface, and wherein the second end portion engages the second plurality of transverse grooves and rotatably couples the first annulus with the second annulus in one rotational direction.

2. The one-way clutch of claim 1 further including teeth disposed about an inner surface of said first annulus.

3. The one-way clutch of claim 1 further including teeth disposed about an outer surface of said second annulus.

4. The one-way clutch of claim 1 wherein said first end portion of each of said struts includes a first cylindrical end and said second end portion includes a second oblique end opposite said first end.

5. The one-way clutch of claim 1 wherein said struts include a slot between said opening and an adjacent end.

6. The one-way clutch of claim 1 whereby relative rotation between said annuli in a first direction transmits torque between said annuli and relative rotation in a second direction opposite said first direction does not transmit torque between said annuli.

7. The one-way clutch of claim 1 wherein said second annulus is concentric to said first annulus.

8. A high torque one-way clutch comprising, in combination, an inner annulus having a plurality of pockets and an interrupted circumferential groove on an outer surface, a plurality of struts disposed in said plurality of pockets, each of said struts including a first end portion disposed within said plurality of pockets and a second end portion opposite the first end portion, each of said struts defining an opening disposed between and at least partially enclosed by the first end portion and the second end portion, a retaining band extending through said opening in each of said struts and about said inner annulus in said circumferential groove, wherein the retaining band exerts a radially outward force on the second end portion of each of the plurality of struts, and an outer annulus disposed about said inner annulus and having a plurality of notches on an inner surface, and wherein the second end portion engages the plurality of notches and rotatably couples the inner annulus with the outer annulus in one rotational direction.

9. The high torque one-way clutch of claim 8 wherein said inner annulus and said outer annulus are coaxial.

10. The high torque one-way clutch of claim 8 wherein said circumferential groove is centered on said outer surface of said inner annulus.

11. The high torque one-way clutch of claim 8 further including teeth disposed about an inner surface of said inner annulus and said outer surface of said outer annulus.

12. The high torque one-way clutch of claim 8 wherein said first end portion of each of said struts includes a first cylindrical end and said second end portion includes a second oblique end opposite said first end.

13. The high torque one-way clutch of claim 12 wherein said struts include a slot between said opening and said first cylindrical end.

14. An overrunning clutch comprising, in combination, an inner annulus having a plurality of transverse pockets and an interrupted peripheral groove on an outer surface, a plurality of struts disposed in said plurality of transverse pockets, each of said struts including a first end portion disposed within said plurality of transverse pockets and a second end portion opposite the first end portion, each of said struts defining an opening disposed between and at least partially enclosed by the first end portion and the second end portion, a retaining band extending through said opening in each of said struts and about said inner annulus in said peripheral groove, wherein the retaining band exerts a radially outward force on the second end portion of each of the plurality of struts, and an outer annulus disposed about said inner annulus and having a plurality of transverse notches on an inner surface, whereby relative rotation between said annuli in one direction engages said struts in said notches and transmits torque between said annuli.

15. The overrunning clutch of claim 14 wherein said inner annulus and said outer annulus are coaxial.

16. The overrunning clutch of claim 14 wherein said peripheral groove is centered on said outer surface of said inner annulus.

17. The overrunning clutch of claim 14 further including teeth disposed about an inner surface of said inner annulus and said outer surface of said outer annulus.

18. The overrunning clutch of claim 14 wherein said first end portion of each of said struts includes a first cylindrical end and said second end portion includes a second oblique end opposite said first cylindrical end.

19. The overrunning clutch of claim 18 wherein said struts include a slot between said opening and said first cylindrical end.

20. The overrunning clutch of claim 14 wherein said struts include a first flat side and a second flat side parallel with said first flat side, and wherein said first cylindrical end is shaped substantially as a half cylinder between the first flat side and the second flat side.

21. The overrunning clutch of claim 14 wherein said opening is radially bounded by said second end portion.

* * * * *